(12) United States Patent
Endo

(10) Patent No.: US 7,151,526 B2
(45) Date of Patent: Dec. 19, 2006

(54) COORDINATES INPUT APPARATUS

(75) Inventor: Michiko Endo, Shinagawa (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 289 days.

(21) Appl. No.: 10/815,760

(22) Filed: Apr. 2, 2004

(65) Prior Publication Data
US 2004/0183778 A1     Sep. 23, 2004

Related U.S. Application Data

(63) Continuation of application No. 09/865,707, filed on May 29, 2001, now Pat. No. 6,738,043.

(30) Foreign Application Priority Data
Jun. 27, 2000     (JP)     ............... 2000-193364

(51) Int. Cl.
*G09G 5/00*     (2006.01)
(52) U.S. Cl. .............. 345/156; 345/174; 345/204; 345/168; 345/169
(58) Field of Classification Search ........ 345/156–169, 345/174, 204; 324/207.13, 207.2, 208; 341/20; 178/18, 19, 19.01, 87; 359/827, 359/830; 273/1, 455; 164/76.1; 250/234; 257/414; 73/514.31
See application file for complete search history.

(56) References Cited

U.S. PATENT DOCUMENTS

| | | | |
|---|---|---|---|
| 4,852,630 A * | 8/1989 | Hamajima et al. ......... 164/76.1 |
| 4,853,630 A | 8/1989 | Houston ................. 324/207.13 |
| 4,991,836 A * | 2/1991 | Joffe .......................... 273/455 |
| 5,434,373 A * | 7/1995 | Komaki ................... 178/19.01 |
| 5,504,502 A | 4/1996 | Arita et al. ................. 345/160 |
| 5,619,195 A | 4/1997 | Allen et al. .................... 341/20 |
| 5,640,178 A * | 6/1997 | Endo et al. ................. 345/161 |
| 5,714,980 A | 2/1998 | Niino et al. |
| 5,850,142 A | 12/1998 | Rountos et al. .......... 324/207.2 |
| 5,969,520 A | 10/1999 | Schottler ................. 329/207.2 |
| 5,969,529 A * | 10/1999 | Eiraku et al. ............... 324/433 |

(Continued)

FOREIGN PATENT DOCUMENTS

EP     0 477 098 A2     3/1992

(Continued)

OTHER PUBLICATIONS

European Search Report in corresponding European Patent Application.

*Primary Examiner*—Bipin Shalwala
*Assistant Examiner*—Prabodh Dharia
(74) *Attorney, Agent, or Firm*—Staas & Halsey LLP

(57) ABSTRACT

An improved coordinates input apparatus for designating a particular set of coordinates in three-dimensional space has a substantially box-like frame, a first magnet, a second magnet, and a plurality of magnetoelectric transducers. The first magnet and second magnet are mounted on the frame and disposed so that sides thereof having identical magnetic poles are disposed opposite each other. The second magnet is disposed so as to be tiltable in response to a disposition of forces acting thereupon. The forces include a repulsive force arising between the first magnet and the second magnet and a pressing force exerted on the second magnet. The plurality of magnetoelectric transducers mounted on the frame opposite the second magnet and output voltage values that vary according to a change in a gap between the magnetoelectric transducers and the second magnet, such that the voltage values indicate a set of X,Y coordinates in two-dimensional space.

18 Claims, 15 Drawing Sheets

U.S. PATENT DOCUMENTS

| | | | |
|---|---|---|---|
| 6,144,370 A * | 11/2000 | Eleyan et al. | 345/167 |
| 6,266,046 B1 * | 7/2001 | Arita | 345/156 |
| 6,288,854 B1 * | 9/2001 | Toyoda | 359/830 |
| 6,369,806 B1 * | 4/2002 | Endo et al. | 345/174 |
| 6,501,458 B1 | 12/2002 | Baker et al. | 345/161 |
| 6,606,085 B1 * | 8/2003 | Endo et al. | 345/161 |
| 6,762,748 B1 * | 7/2004 | Maatta et al. | 345/157 |
| 6,836,267 B1 * | 12/2004 | Endo et al. | 345/174 |
| 6,937,226 B1 * | 8/2005 | Sakurai et al. | 345/156 |
| 2003/0146899 A1 * | 8/2003 | Sakurai et al. | 345/156 |

FOREIGN PATENT DOCUMENTS

| | | |
|---|---|---|
| EP | 0 749 138 A | 12/1996 |
| JP | 4-509290 | 11/1992 |
| JP | 10-55250 | 2/1998 |
| JP | 11-161418 | 6/1999 |

* cited by examiner

COORDINATES INPUT APPARATUS

CROSS REFERENCE TO RELATED APPLICATION

The subject application is a continuation application of application Ser. No. 09/865,707 filed May 29, 2001 now U.S. Pat. No. 6,738,043 which is now allowed.

BACKGROUND OF THE INVENTION

1. Field of the Invention

The present invention relates to a coordinates input apparatus, and more particularly, to an improved coordinates input apparatus having a simplified structure and that can be used without the need for extensive special operating space.

2. Description of Related Art

In recent years, easy-to-operate pointing devices such as the mouse or digitizer, have come to be widely used instead of keyboards as an input means for desktop computers and the like.

For example, a mouse or a digitizer can be used with desktop computers and the like.

However, the laptop and other portable computers that have become popular in recent years are often used outdoors, in vehicles, and so forth, that is, in locations where there is no adequate flat surface on which to rest the computer. As a result, there is often little or no space in which to operate a pointing device such as a mouse or digitizer.

In response to such a requirement, a pointing device that tilts when pressed and the resulting angle of inclination sensed has been proposed as one type of suitable pointing device that is compact and requires very little space in which to operate.

A description of such a conventional compact pointing device will now be given with reference to FIGS. 1, 2, 3 and 4.

FIG. 1 is a diagram showing a front cross-sectional view of a conventional pointing device illustrating a state in which a key-top operating portion of the apparatus is in a substantially vertical state. FIG. 2 is a diagram showing a front cross-sectional view of a conventional pointing device illustrating a state in which the key-top operating portion of the apparatus is in a tilted state. FIG. 3 is a diagram illustrating the relative positions of the magnet and the magnetoelectric transducer of the pointing device shown in FIGS. 1 and 2. FIG. 4 is a diagram showing a side view of the magnet and magnetoelectric transducer of FIG. 3.

According to the conventional art, a pointing device 1 comprises an operating part 2, a pressure part 3 and a coordinates sensor 4.

The operating part 2 comprises a key top 2a, a stick 2b fixedly mounted to one end of the key top 2a and consisting of a shaft 2b-1 extending downward and terminating in a distal end formed into the shape of a hemisphere 2b-2 with the rounded half upward (in the drawing), and a holder 2c which forms a sphere when joined to the hemispherical tip 2b-2 of the stick 2b. A flange 2b-3 extends horizontally from a lower edge of the hemisphere 2b-2, around the entire periphery thereof. The hemispherical tip 2b-2 operating part 2 is contained within a container composed of an upper cover 5a with an aperture in the center thereof and a flat housing 5b, with a lower portion of the hemisphere 2b-2 positioned above the center of the housing 5b and supported by a concavity 5b-2 formed in a projection 5b-1 projecting upward from the center of the housing 5b. At the same time, the upper part of the hemisphere 2b-2 is retained in place by an inwardly and downwardly projecting part formed along the edge 5a-1 of the opening in the upper cover 5a.

The pressure part 3 comprises a cylindrical slider 3a slidably movable in a vertical direction along side walls 5a-2 of the upper cover 5a and a coil spring 3b positioned between the floor of a concavity 3a-1 formed inside the slider 3a and the upper cover 5a and attached at both ends thereto so as to impel the slider 3a downward at all times. A cylindrical projection 3a-2 that projects toward the hemisphere 2b-2 is provided on the slider 3, such that a lower surface of this projection 3a-2 engages the upper surface of the flange 2b-3.

The coordinates sensor 4 comprises a magnet 4a provided on an interior of the holder 2c and a plurality of magnetoelectric transducers 4b mounted on a printed circuit board 6 bonded to a bottom surface of the frame 5, the magnetoelectric transducers 4b being recessedly mounted with respect to the bottom surface of the holder 2c. It should be noted that there are actually four magnetoelectric transducers 4b-1 through 4b-4 displaced a predetermined distance from the center line of the magnet 4a, as can be seen in FIG. 3.

In the pointing device 1 having the structure described above, pressing and moving the key top 2a slides the slider 3a upward against the spring force of the coil spring 3b and, as shown in FIG. 2, the stick 2b is tilted in a given direction. At this time, the magnet 4a built into the holder 2c is tilted with respect to the magnetoelectric transducer 4b mounted on the printed circuit board 6.

Then, by releasing the key top 2a, the spring force of the compressed coil spring 3b returns the key top 2a to an original position before it was manipulated, thus returning the positional relation between the magnet 4a and the magnetoelectric transducer 4b to an initial state as well.

A description will now be given of the principle upon which the coordinates detector of the pointing device 1 operates.

In a case in which the stick 2b is perpendicular to the printed circuit board 6 as shown in FIG. 1, then as shown by the solid line in FIG. 4 the magnet 4a is separated from the four magnetoelectric transducers 4b (shown as 4b-1 through 4b-4 in FIG. 3) by a certain equal distance. Accordingly the magnetic field imparted to each of the magnetoelectric transducers 4b-1 through 4b-4 is essentially equal and thus, for example, if the direction from which the magnetic field is detected is perpendicular to the printed circuit board 6, then the detected magnetic field direction components B1 through B4 of the magnetic flux density passing through the magnetoelectric transducers 4b-1 through 4b-4 would be substantially equal, and therefore the output voltage of each of the magnetoelectric transducers would also be essentially equal.

By contrast, if the stick 2b is tilted with respect to the printed circuit board 6 as shown in FIG. 2, then the distance separating the magnet 4a from the magnetoelectric element 4b changes as indicated by the dashed line in FIG. 4. In the case of FIG. 4, the magnet 4a simultaneously approaches the magnetoelectric transducer 4b-1 and moves further away from the magnetoelectric transducer 4b-3, so the detected magnetic field direction component B1 increases while the detected magnetic field direction component B3 decreases and the output voltages from the magnetoelectric transducers 4b-1 and 4b-3 change as well, with an angle of inclination θ of the key top 2a deduced from a calculation of the difference in output between the magnetoelectric transducers 4b-1 and 4b-3 and further converted into an X-axis coordinate value for the purpose of moving a cursor on a display (coordinate space). Similarly, by calculating the difference in output voltages between the magnetoelectric transducers 4b-2 and 4b-4 the angle of inclination θ of the key top 2a can be converted into a Y-axis coordinate value. That is, XY coordinate values can be obtained when the stick 2b tilts in a given direction based on the direction and angle of that tilt. These XY coordinates are input into a computer and the direction, extent and speed of movement of the pointer or cursor then displayed on the display.

However, the conventional pointing device as described above has a disadvantage in that the restorative force of a compressed coil spring 3b is employed to return the key top 2a to its original position after it has been tilted in a given direction, with the result that the overall size of the conventional pointing device is increased at least by an amount equivalent to that portion of the coil spring 3b that engages the key top 2a, thus limiting the extent to which the pointing device as a whole, and in particular the key top 2a, can be reduced in size and made more compact.

BRIEF SUMMARY OF THE INVENTION

Accordingly, it is an object of the present invention to provide an improved and useful coordinates input apparatus in which the above-described disadvantage is eliminated, and more specifically, to provide an improved and useful coordinates input apparatus having a simplified structure and capable of accommodating further reductions in size, without the need for extensive special operating space.

The above-described object of the present invention is achieved by a coordinates input apparatus for designating a particular set of coordinates in three-dimensional space, the coordinates input apparatus comprising a substantially box-like frame, a first magnet, a second magnet, and a plurality of magnetoelectric transducers. The first magnet and second magnet are mounted on the frame and disposed so that sides thereof having the same magnetic poles are disposed opposite each other. The second magnet is tiltable in response to a disposition of forces acting on the second magnet. These forces are a downward pressure exerted by depressing an operating part located above the magnet and a repulsive force generated between the two magnets because the same poles are disposed opposite each other. The plurality of magnetoelectric transducers are mounted on the frame opposite the second magnet and output voltage values that vary according to a change in a gap between the magnetoelectric transducers and the second magnet, such that the voltage values indicate a set of X,Y coordinates in two-dimensional space.

As will be appreciated by those skilled in the art, the exact extent of the gaps between the first and second magnets and the second magnet and the magnetoelectric transducer is determined experimentally, and can be any arbitrary value provided such values are within limits designed to insure the proper workings of the invention, a consideration which applies to all of the embodiments described below. Moreover, though each of a given pair of magnetoelectric transducers indicates a different voltage value depending on the size of the gap between the second magnet and the magnetoelectric transducer, the difference between both voltage values is detected as a signal that indicates the X or Y coordinates differential output.

According to this aspect of the invention, the need for an impelling mechanism such as a coil spring of the conventional art is eliminated, thereby providing a simplified, more compact two-dimensional (X,Y) coordinates input apparatus.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted. Additionally, in order to facilitate an understanding of the invention, hatching is used in front-cross-sectional views of the embodiments of the invention to indicate the magnets and magnetoelectric transducers.

A description will now be given of the principle on which the operation of the embodiments of the present invention described below are based, with reference to FIG. 5 and FIG. 6.

Figure 5:
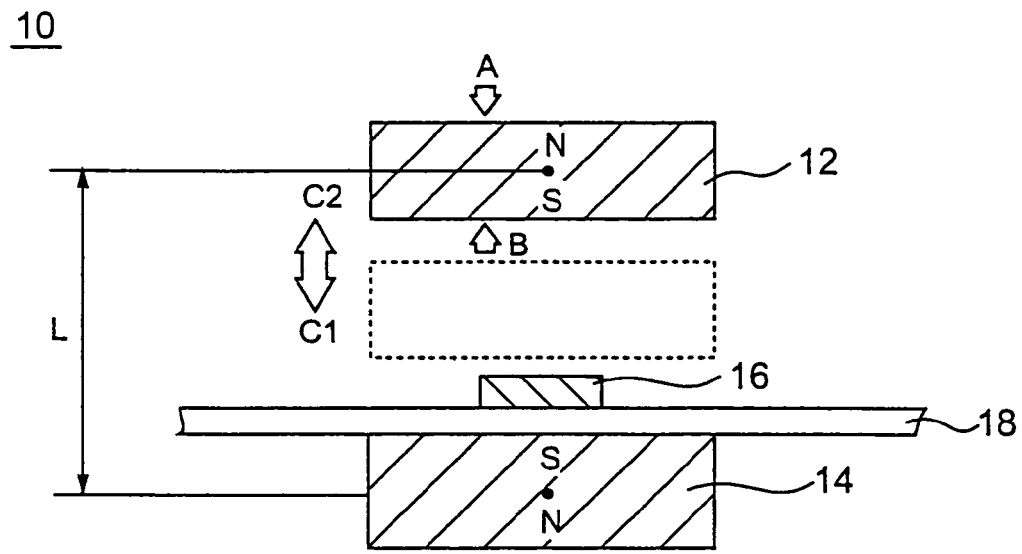
FIG. 5 is a diagram illustrating the principle on which operation of a coordinates input apparatus according to the present invention is based, showing a magnet thereof in a raised position.

FIG. 5 is a diagram illustrating the principle on which operation of a coordinates input apparatus according to the present invention is based, showing a magnet thereof in a raised position. FIG. 6 is a diagram illustrating the principle on which operation of a coordinates input apparatus according to the present invention is based, showing a magnet thereof in a tilted position.

As shown in the diagram, the coordinates input apparatus 10 according to one embodiment of the present invention includes a second magnet 12 and a first magnet 14, positioned so that respective, identical magnetic poles thereof are disposed opposite each other. As depicted in the diagram, in this case the magnetic south poles of the two magnets are disposed facing each other. As will be appreciated by those of skill in the art, the two magnets can instead be disposed so that their magnetic north poles face each other. Additionally, the coordinates input apparatus 10 further includes magnetoelectric transducers 16. The first magnet 14 and the magnetoelectric transducers are fixedly mounted on a circuit board 18. The second magnet 14 is displaceable, and is used for coordinate input operation.

A description will now be given of a raising of the second magnet 12, with reference to FIG. 5.

When the second magnet 12 is depressed, a pressing force or pressure is exerted on the second magnet 12 in the direction indicated by arrow A at the same time that a repulsive force generated between the first magnet 14 and the second magnet 12 is exerted upward on the second magnet 12 in the direction indicated by arrow B, against the downward force. The combination of these forces, that is, their relative strengths, moves the second magnet 12 up and down in the direction of arrows C1-C2.

In other words, pressing downward on the second magnet 12 against the force of repulsion generated between the first magnet 14 and the second magnet 12 lowers the second magnet 12 to a position at which the two forces described above are in balance. When input is complete and the downward pressure released, the repulsive force arising between the first and second magnets 14 and 12 restores the second magnet 12 to its original position.

As will be appreciated by those of skill in the art, as the distance between the first and second magnets 14 and 12 decreases, that is, as the force with which the second magnet 12 is depressed increases, the repulsive force generated between the first and second magnets 14 and 12 also increases. As a result, the second magnet 12 is delivered smoothly and reliably to the original position even as the second magnet 12 approaches the magnetoelectric transducers 16.

The magnetoelectric transducers 16 continuously produce an output that varies with the strength of the magnetic field imparted thereto from the first and second magnets 14, 12, including an input operation initial state. In the present embodiment, the second magnet 14 is fixedly mounted on the circuit board 18, so the output of the magnetoelectric transducers 16 varies as the magnetic field imparted to the magnetoelectric transducers varies according to the displacement of the second magnet 12. As a result, it is possible to indicate a Z coordinate in three-dimensional space.

It should be noted that a top part of the second magnet 12 is restrained by any appropriate means (not shown in the diagram) so that the second magnet 12 does not rise beyond a distance L separating the first and second magnets 14, 12, such that the repulsive force generated between the first and second magnets 14, 12 operates effectively against the second magnet 12.

A description will now be given of a tilting of the second magnet 12, with reference to FIG. 6.

Figure 6:
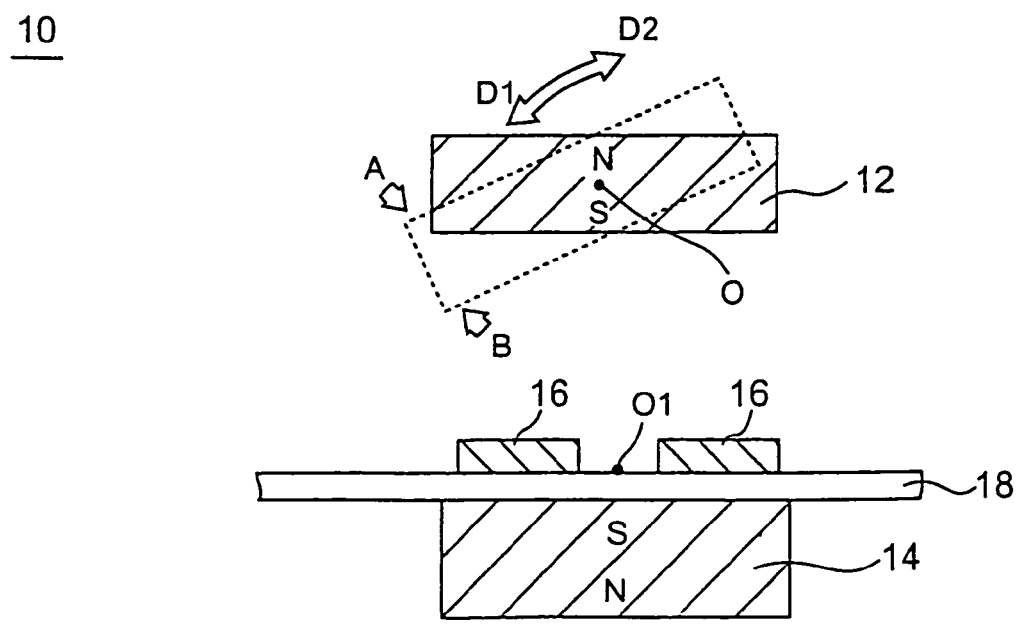
FIG. 6 is a diagram illustrating the principle on which operation of a coordinates input apparatus according to the present invention is based, showing a magnet thereof in a tilted position.

As shown in FIG. 6, the second magnet 12, unlike that shown in FIG. 5, is pivotally supported about a central point O by a means not shown in the diagram. A plurality of magnetoelectric transducers 16 are arranged beneath the second magnet 12 so as to be symmetrically disposed about a central point on the circuit board 18 that corresponds to the central point O1 as shown in the diagram.

If the second magnet 12 is then pressed downward at an angle against the repulsive force generated between the first and second magnets 14, 12, for example in the direction indicated by the arrow D1 in the drawing, then the second magnet 12 is displaced by the pressing force to a desired position. When input is completed and the second magnet 12 is released, the repulsive force generated between the first and second magnets 14, 12 moves the second magnet 12 in the direction indicated by arrow D2 and returns the second magnet 12 to its original position. In this case, the second magnet 12, originally positioned substantially horizontally, is capable of being tilted 360 degrees in any direction with respect thereto, in so doing achieving the same effect as when the second magnet 12 is depressed directly downward as, for example, shown in FIG. 5.

As described above, the output of each of the magnetoelectric transducers 16 varies as the distance between the magnetoelectric transducers 16 and the second magnet 12 changes, thus changing the strength of the magnetic field imparted to the magnetoelectric transducers 16. As a result, it is possible to indicate an X,Y coordinate in two-dimensional space.

Figure 1:
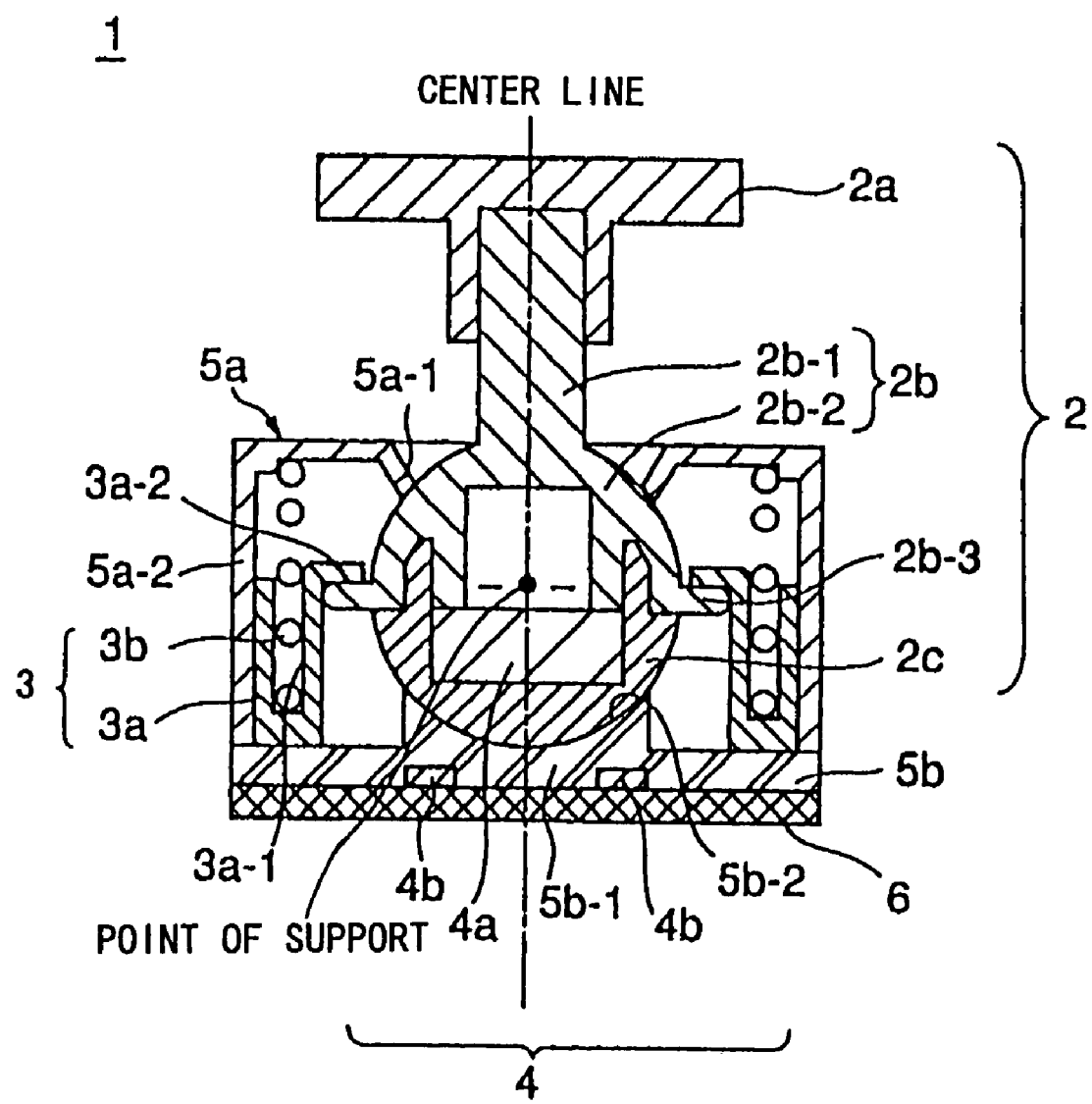
FIG. 1 is a diagram showing a front cross-sectional view of a conventional pointing device illustrating a state in which the key top operating portion of the apparatus is in a substantially vertical state.
Figure 2:
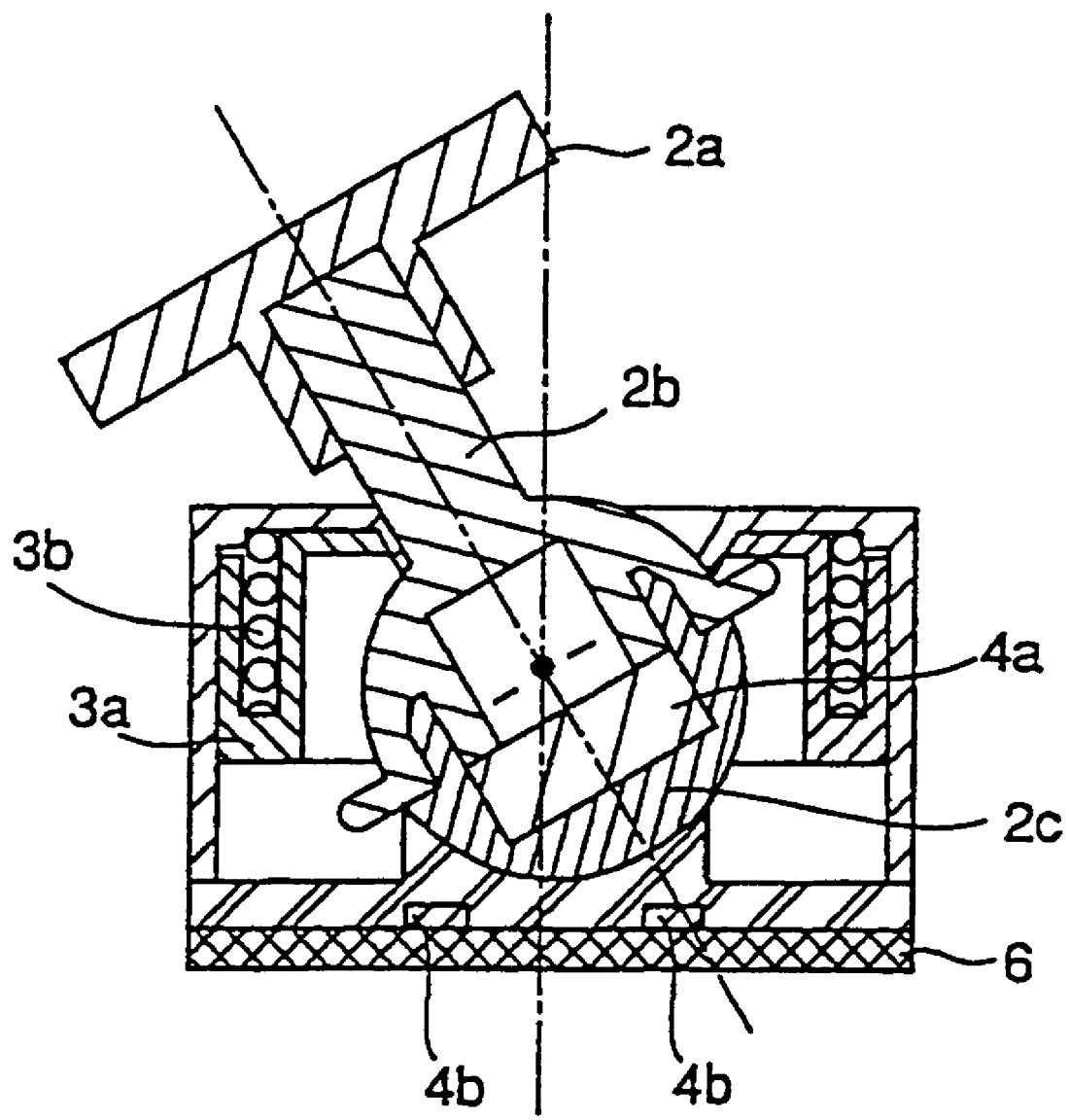
FIG. 2 is a diagram showing a front cross-sectional view of a conventional pointing device illustrating a state in which the key top operating portion of the apparatus is in a tilted state.
Figure 3:
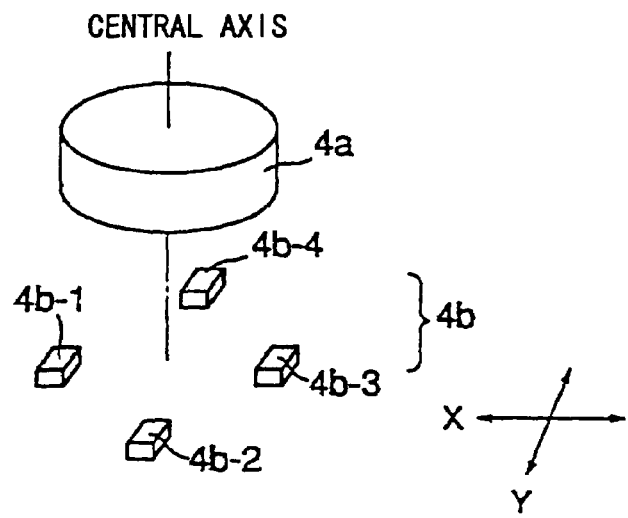
FIG. 3 is a diagram illustrating the relative positions of the magnet and the magnetoelectric transducer of the pointing device shown in FIGS. 1 and 2.
Figure 4:
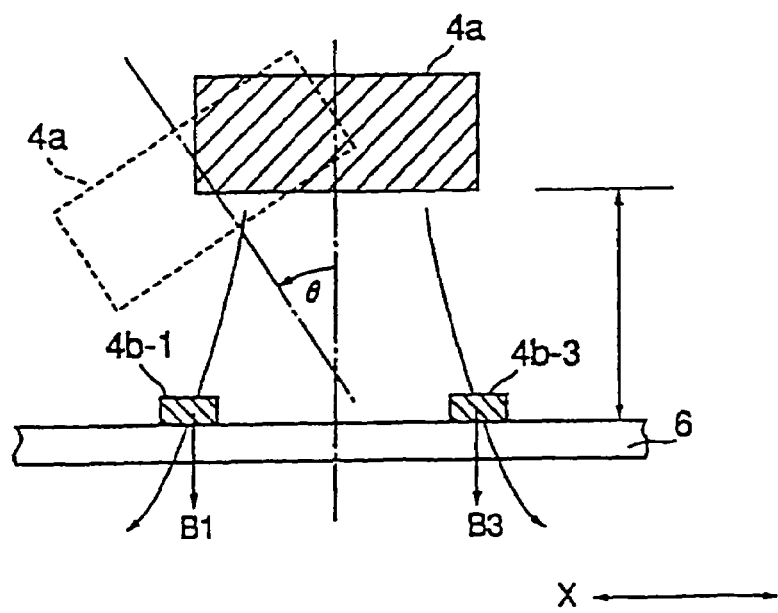
FIG. 4 is a diagram showing a side view of the magnet and magnetoelectric transducer of FIG. 3.

In the conventional art, as shown for example in FIGS. 1 and 2, a spring force of a coil spring is used to position the magnet 12. The compressed coil spring acts to counterbalance the downward pressure exerted on the magnet 12 when the magnet 12 is depressed during an input operation, and also acts to return the magnet 12 to its original position when the input operation is completed and the pressure released. However, as described above, the operating principle on which the coordinates input apparatus 10 is based does not employ a coil spring but instead employs an additional magnet 14 and uses the repulsive force generated between the first magnet 14 and the second magnet 12 when these two magnets are positioned with the same magnetic poles placed opposite each other, thus simplifying the structure of the apparatus and allowing it to be made more compact.

A description will now be given of a coordinates input apparatus according to a first embodiment of the present invention, with reference to FIG. 7 and FIG. 8.

Figure 7:
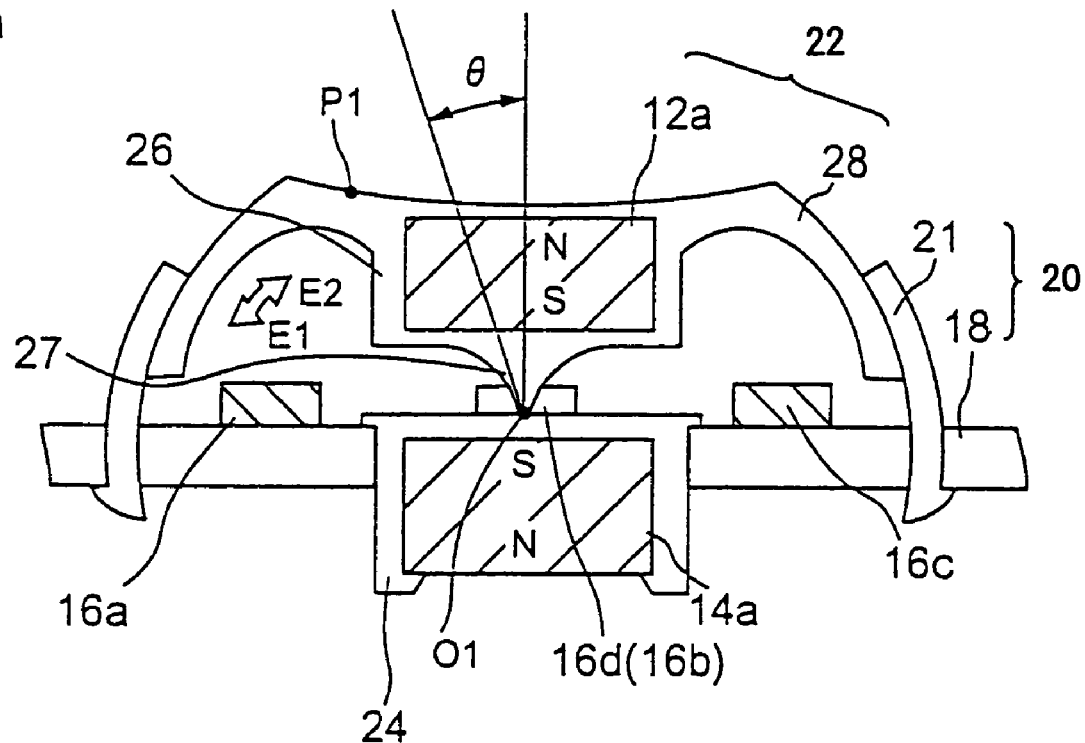
FIG. 7 is a front cross-sectional view of a coordinates input apparatus according to a first embodiment of the present invention.

FIG. 7 is a front cross-sectional view of a coordinates input apparatus according to a first embodiment of the present invention. FIG. 8 is a graph showing differential output characteristics of the coordinates input apparatus according to the first embodiment of the present invention.

As shown in FIG. 7, the coordinates input apparatus 10a comprises essentially a housing 20 that includes a holder 21 and a circuit board 18, an operating part 22 that includes a second magnet 12a and a slider 28, magnetoelectric transducers 16a, 16b, 16c and 16d and a substantially cylindrical first magnet 14a.

The container 20, as noted above, contains a holder 21 having a curved surface and which extends vertically in FIG. 7. The circuit board 18 is substantially horizontal, and forms the bottom surface of the housing 20. The holder 21 and the circuit board 18 are formed as a single integrated unit.

The four magnetoelectric transducers 16a, 16b, 16c and 16d are arranged atop the top surface of the circuit board 18, in a substantially circular fashion about the central point O1, at intervals of approximately 90 degrees. A cylindrical case 24 with a closed top is affixed to the circuit board in the center of the circle formed by the four magnetoelectric transducers 16a, 16b, 16c and 16d. The cylindrical first magnet 14a is positioned inside the case 24, so that its south magnetic pole faces upwards as shown in the diagram.

The operating part 22 is roughly the shape of an upside-down bowl, with a cylindrical projection 26 protruding downward from a central inner portion thereof. The interior of the cylindrical projection 26 contains the lower portion of the cylindrical first magnet 14a, the north magnetic pole thereof facing downward. Accordingly, the second magnet 12a and the cylindrical first magnet 14a, which are formed to substantially the same dimensions and with their magnetic south poles opposed are separated by a downwardly facing protuberance 27 projecting from the bottom of the cylindrical projection 26. The force of repulsion arising between the two magnets causes the slider 28, which has a curved surface, to be pressed upward against the interior of the holder 21, in such a way as to be pivotably slidable in the direction indicated by the double-headed arrow E1-E2.

The holder 21, the operating part 22, and the circuit board 18 (which in the above-described structure essentially comprises a portion of the frame) together form the frame portion of the input unit. It should be noted that the coordinates input apparatus 10a as described above is further provided with a main frame part (not shown in the diagram) that houses a device main unit that includes electronic components for processing signals generated by the magnetoelectric transducers 16a, 16b, 16c and 16d upon input operation and transmits the processed signals to a personal computer (not shown in the diagram).

It should be noted that the magnets 12a and 14a may be ferrite magnets having a diameter of approximately 5 mm and a thickness of approximately 1.5 mm, with the south magnetic poles thereof disposed opposite each other across a gap of approximately 1 mm. Additionally, the magnetoelectric transducers 16a, 16b, 16c and 16d, for example, may be GaAs Hall elements having an output sensitivity of approximately 150 mv/0.1 T/5V. The magnetoelectric transducers 16a, 16b, 16c and 16d are arranged atop the circuit board 18 so that the detected magnetic field direction is perpendicular to the circuit board 18, with a gap of approximately 9 mm between opposed magnetoelectric transducers 16a and 16c and a gap of approximately 9 mm between opposed magnetoelectric transducers 16b and 16d.

A description will now be given of the functioning of the coordinates input apparatus 10a having the structure described above.

In a case in which, for example, a point P1 on the operating part 22 is depressed in a coordinates input operation against the repulsive force generated between the magnet 12a and the magnet 14a, the operating part 22 causes the slider 28 to slide along the interior of the holder 21 in the direction of arrow E1, using the point O1 at which the downwardly facing protuberance 27 projecting from the bottom of the cylindrical projection 26 contacts the top of the case 24 as a pivot. When the input operation is complete and the downward pressure on the operating part 22 is released, the repulsive force generated between the two magnets 12a, 14a causes the operating part 22 to tilt in the direction of arrow E2, thus returning the operating part 22 to its original position.

The strength of the magnetic field applied to the individual magnetoelectric transducers 16a, 16b, 16c and 16d varies according to the displacement of the magnet 12a mounted on the operating part 22, thus causing the output of the individual magnetoelectric transducers 16a, 16b, 16c and 16d to change and thereby enabling designation of a set of X,Y coordinates in two-dimensional space. In other words, assuming for the sake of illustration that the magnetoelectric transducers 16a and 16c are used to designate the X coordinate and the magnetoelectric transducers 16b and 16d are used to designate the Y coordinate, then the changes in the outputs of the individual magnetoelectric transducers 16a, 16b, 16c and 16d are detected as X,Y coordinate differential outputs. The detected values are then sent as coordinates input data to a personal computer or other similar processing device not shown in the diagram via the circuit board 18.

Figure 8:
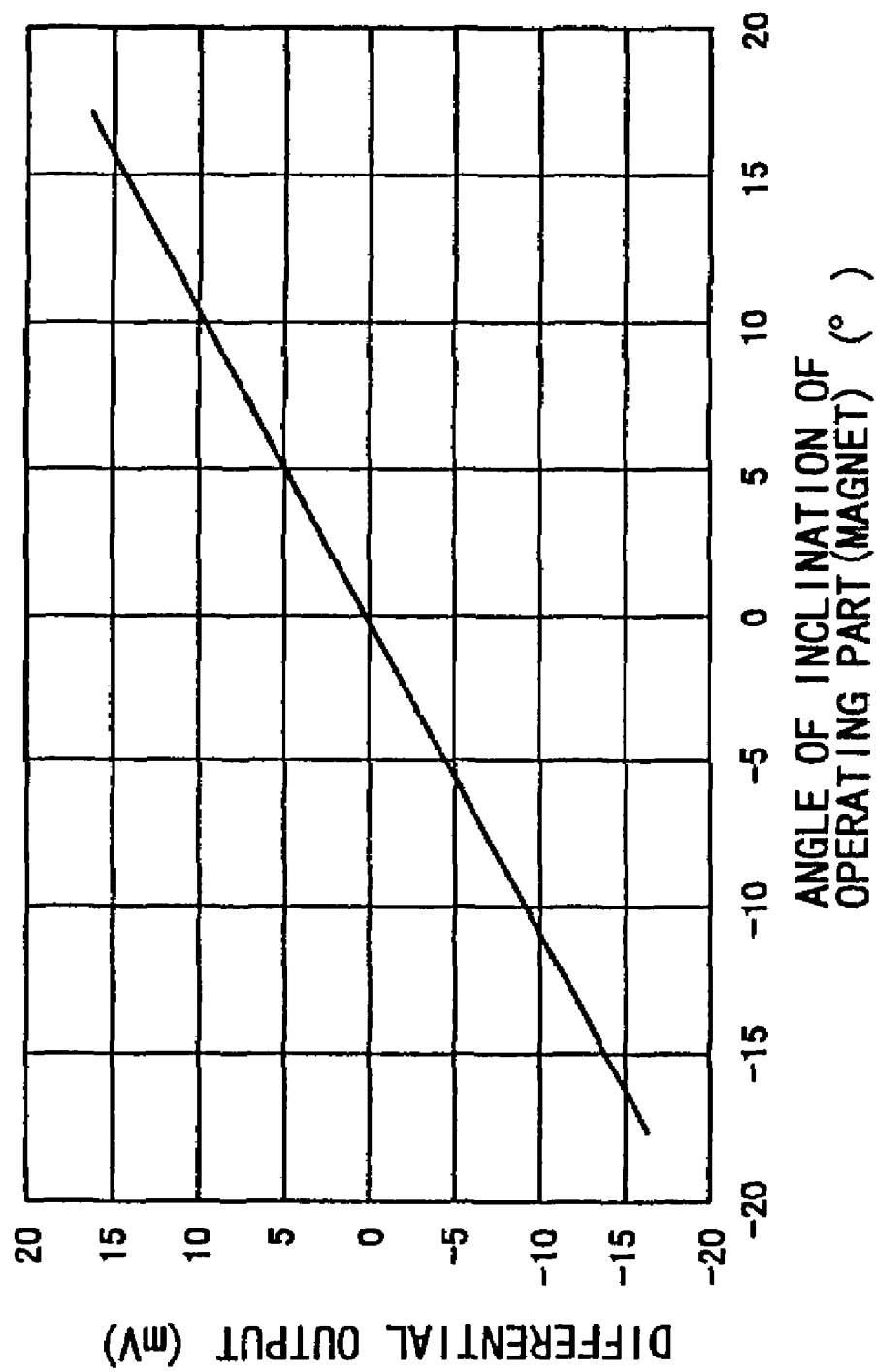
FIG. 8 is a graph showing differential output characteristics of the coordinates input apparatus according to the first embodiment of the present invention.

FIG. 8 is a graph showing differential output characteristics of the coordinates input apparatus according to the first embodiment of the present invention. More specifically, the graph shows the relation between the operating part 22 of the coordinates input apparatus 10a, in other words the angle θ of inclination of the magnet 12a (in degrees), and the differential outputs (in mV) that are the signals indicating the differing voltage values of the magnetoelectric transducers 16a, 16c dedicated to the X coordinate. As can be understood from the drawing, the differential output is obtained as a value that is directly proportional to the angle of inclination of the magnet 12a.

According to the coordinates input apparatus 10a described above, X,Y coordinate value input data can be obtained with a simpler, more compact coordinates input apparatus than the conventional art allows. The compactness of the coordinates input apparatus 10a is in part due to the use of Hall elements for the magnetoelectric transducers 16a, 16b, 16c and 16d. The use of Hall elements also has the advantage of enabling the coordinates input apparatus 10a to be produced inexpensively.

A description will now be given of a coordinates input apparatus according to a second embodiment of the present invention, with reference to FIG. 9, FIG. 10 and FIG. 11.

Figure 9:
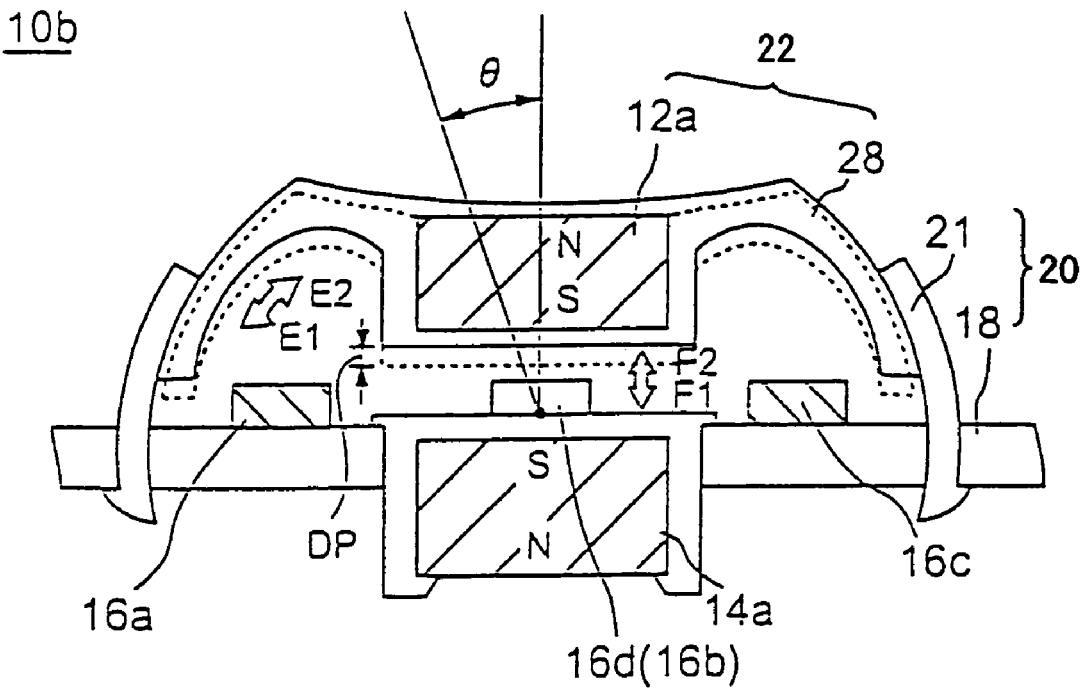
FIG. 9 is a front cross-sectional view of a coordinates input apparatus according to a second embodiment of the present invention.

FIG. 9 is a front cross-sectional view of a coordinates input apparatus according to a second embodiment of the present invention. FIG. 10 is a graph showing differential output characteristics in the X(Y) directions of the coordinates input apparatus according to the second embodiment of the present invention. FIG. 11 is a graph showing differential output characteristics in the Z direction of the coordinates input apparatus according to the second embodiment of the present invention.

As can be appreciated from FIG. 9, the coordinates input apparatus 10b has essentially the same basic structure as the coordinates input apparatus 10a according to the first embodiment of the present invention as described above, the only substantive difference between the two embodiments being the coordinates input apparatus 10b according to the second embodiment does not have the protuberance 27 projecting from the bottom of the cylindrical projection 26 of the coordinates input apparatus 10a according to the first embodiment. Yet in this case, too, the gap between the two magnets 12a, 14a is within a range that gives full effect to the force of repulsion arising between the two magnets 12a, 14a, such that, when the operating part 22 is released and hence the downward pressure on the magnet 12a is eliminated, this repulsive force causes the slider 28 of the operating part 22 to contact and be retained by the holder 21 of the housing 20. As a result, the operating part 22 is both tiltable in the direction of arrows E1-E2 as well as depressible in the direction of arrows F1-F2, either directly or at an angle of inclination.

It should be noted that the magnets 12a and 14a may, for example, be SmCo magnets having a diameter of approximately 5 mm and a thickness of approximately 1.5 mm, with the south magnetic poles thereof disposed opposite each other across a gap of approximately 1 mm. Additionally, the magnetoelectric transducers 16a, 16b, 16c and 16d, for example, may be GaAs Hall elements having an output sensitivity of approximately 150 mv/0.1 T/5V. The magnetoelectric transducers 16a, 16b, 16c and 16d are arranged atop the circuit board 18 so that the detected magnetic field direction is perpendicular to the circuit board 18, with a gap of approximately 9 mm between opposed magnetoelectric transducers 16a and 16c and a gap of approximately 9 mm between opposed magnetoelectric transducers 16b and 16d.

A description will now be given of the functioning of the coordinates input apparatus 10b having the structure described above.

Figure 10:
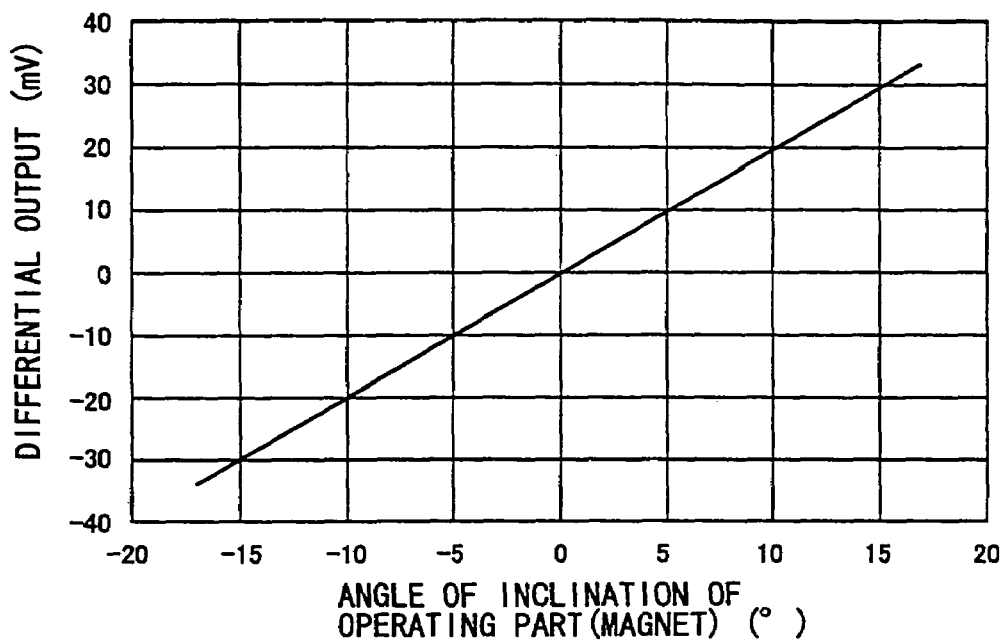
FIG. 10 is a graph showing differential output characteristics in the X(Y) directions of the coordinates input apparatus according to the second embodiment of the present invention.
Figure 11:
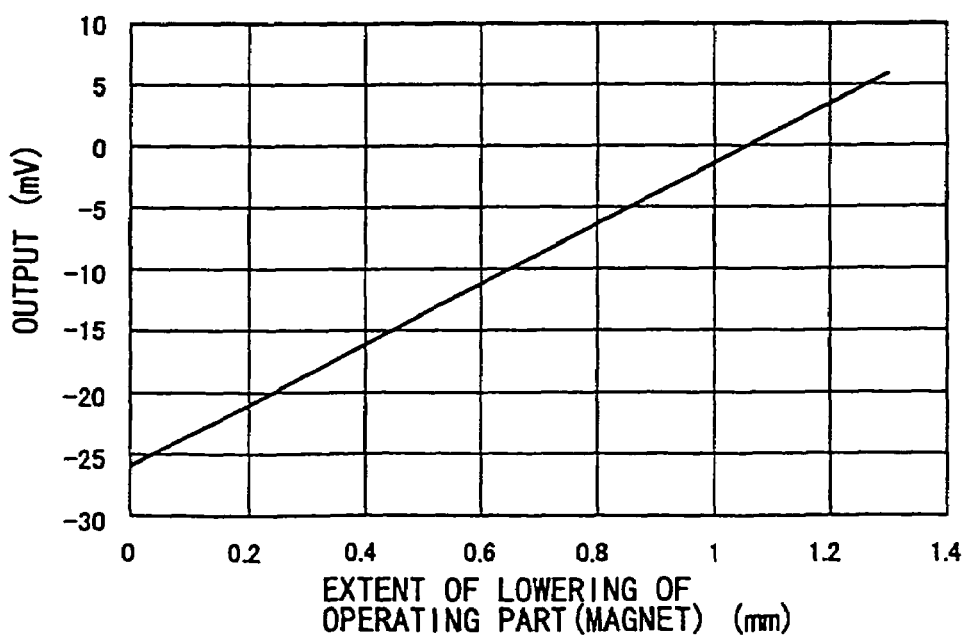
FIG. 11 is a graph showing differential output characteristics in the Z direction of the coordinates input apparatus according to the second embodiment of the present invention.

The relation between the angle of inclination in degrees of the operating part 22 of the coordinates input apparatus 10b, in other words the angle of inclination of the magnet 12a, on the one hand, and the differential output in mV of the magnetoelectric transducers 16a, 16b, 16c and 16d on the other in an input operation is indicated in FIG. 10, with FIG. 11 showing a similar relation between the extent in mm to which the magnet 12a is depressed and the output in mV of the magnetoelectric transducers 16a, 16b, 16c and 16d in an input operation. It should be noted that, in the latter case, the output is an average of the voltage differences of each of the magnetoelectric transducers 16a, 16b, 16c and 16d corresponding to changes in a distance at which the change in distance between the magnet 12a and the magnetoelectric transducers 16a, 16b, 16c and 16d is the same for all the magnetoelectric transducers 16a, 16b, 16c and 16d. In FIG. 10, the differential output (in mV), that is, the value that corresponds to the X,Y coordinate indication amount, is a value that is proportional to the angle θ of inclination of the magnet 12a.

According to the coordinates input apparatus 10b described above, Z-coordinate value input data in addition to X,Y coordinate value input data can be obtained promptly and accurately using a simpler calculation process than the conventional art allows, without deployment of a special magnetoelectric transducer for the Z coordinate. The compactness of the coordinates input apparatus 10a is in part due to the use of Hall elements for the magnetoelectric transducers 16a, 16b, 16c and 16d. The use of Hall elements also has the advantage of enabling the coordinates input apparatus 10a to be produced inexpensively.

It should be noted that the same effect as is obtained with coordinates input apparatus 10b can be obtained with coordinates input apparatus 10a by replacing the downwardly facing protuberance 27 projecting from the bottom of the cylindrical projection 26 with an elastic material that flexes in response to a downward pressure exerted on the second magnet 12a.

Additionally, the coordinates input apparatus 10b can be configured so as to include a fifth magnetoelectric transducer at the center of the circle formed by the symmetrical placement of the four magnetoelectric transducers 16a, 16b, 16c and 16d described above, in other words at the point O1 shown in FIG. 6 and FIG. 9 above. Such an arrangement does not require the use of the average of the outputs of the magnetoelectric transducers 16a, 16b, 16c and 16d but instead uses the output voltage changes detected at the fifth magnetoelectric transducer to calculate the Z coordinate promptly and accurately.

Additionally, the coordinates input apparatus 10b can be configured so that the output that corresponds to the Z-coordinate value is a binary ON/OFF signal around a predetermined threshold, such that when the operating part 22 is pressed with a certain force and the Z coordinate turns ON and remains ON, the cursor or pointer continues to move only in the Z direction.

A description will now be given of a coordinates input apparatus according to a third embodiment of the present invention, with reference to FIG. 12 and FIG. 13.

Figure 12:
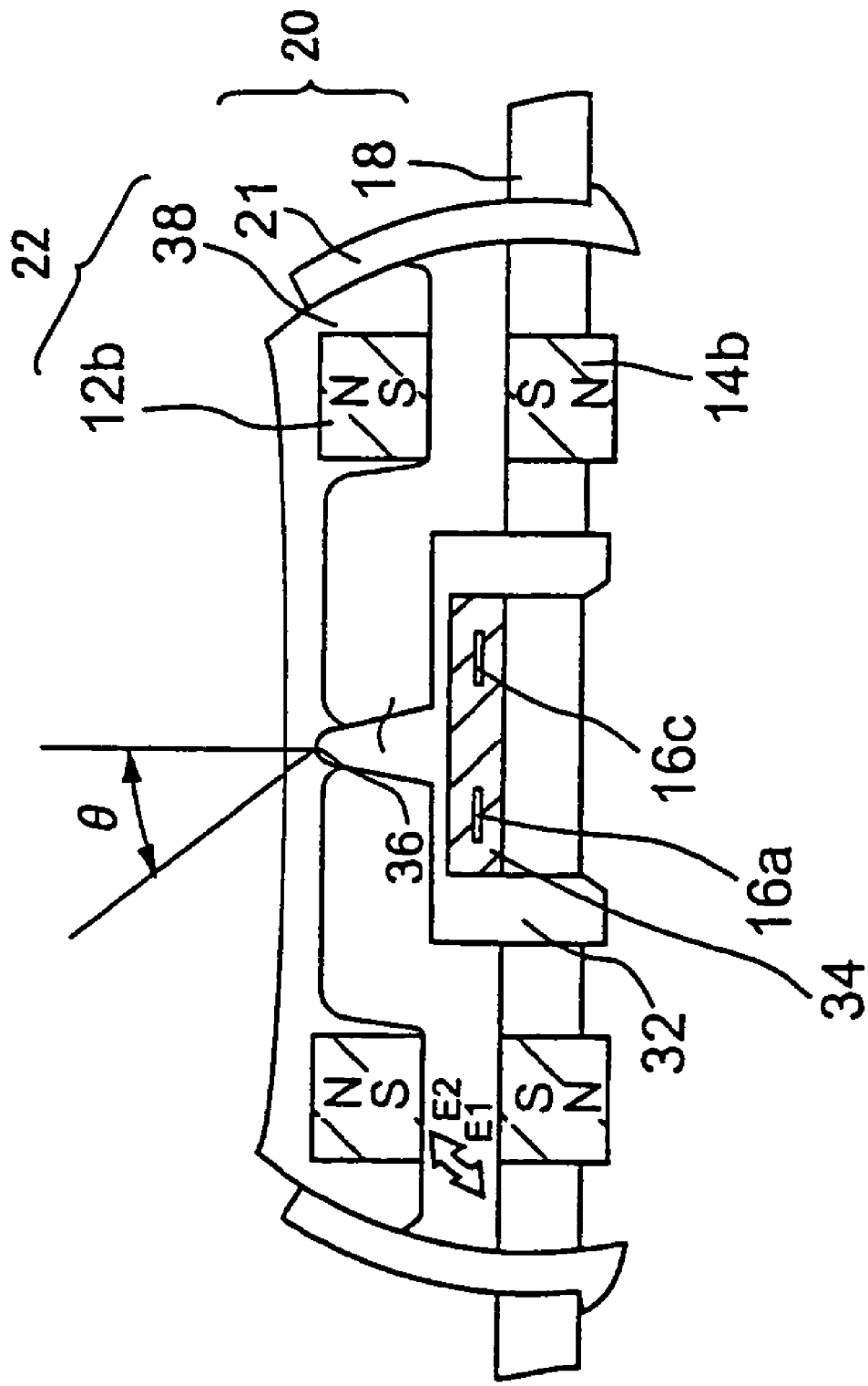
FIG. 12 is a front cross-sectional view of a coordinates input apparatus according to a third embodiment of the present invention.

FIG. 12 is a front cross-sectional view of a coordinates input apparatus according to a third embodiment of the present invention. FIG. 13 is a graph showing differential output characteristics in the X(Y) directions of the coordinates input apparatus according to the third embodiment of the present invention.

As shown in FIG. 12, the coordinates input apparatus 10c has a basic structure that is essentially the same as that for coordinates input apparatuses 10a and 10b, comprising the housing 20, the operating part 22, the magnetoelectric transducers 16a, 16b, 16c and 16d and the magnet 14b. The housing 20 in turn comprises the circuit board 18 and the holder 21 with its curved surface.

A case 32 having a projection 30 on the top is fixedly attached to the circuit board 18 at a center of a top surface of the circuit board 18. The magnetoelectric transducers 16a, 16b, 16c and 16d (with only 16a and 16c shown in FIG. 12) are integrated into a package 34 that is housed inside the case 32. An annular first magnet 14b is provided around the periphery of the case 32 and mounted on the circuit board 18 so that the south magnetic pole faces upward. It should be noted that the position of the package 34 is not limited to that shown in FIG. 12, provided that the package is located inside of an extended cylindrical boundary defined by an inner cylindrical surface of the annular first magnet 14b.

The operating part 22 is shaped substantially as a squat cylinder, with the top covered and the walls 38 having a curved outer surface and a straight, substantially vertical inner surface, such that the walls 38 are thicker at a lower base portion than at an upper edge portion. A downwardly concave portion 36 is formed at a center of an inner top surface of the operating part 22. A tip of the projection 30 of the case 32 described above engages the concave portion 36, so that the operating part 22 is supported by the case 32. The walls 38 of the operating part 22 contain the second magnet 12b, disposed so that the south magnetic pole faces downward, opposing the south magnetic pole of the first magnet 14b. Accordingly, the two magnets 12b and 14b are separated by the case 32, with the walls 38 of the operating part 22 being pressed against and engaged by the interior of the holder 21 by the repulsive force arising between the two magnets 12b and 14b, in such a way as to be slidable in the direction of arrows E1-E2.

In the above-described embodiment, too, it should be noted that the magnets 12b, 14b may, for example, be SmCo plastic magnets having a diameter of approximately 5 mm and a thickness of approximately 1.5 mm, with the south magnetic poles thereof disposed opposite each other across a gap of approximately 1 mm. Additionally, the magnetoelectric transducers 16a, 16b, 16c and 16d, for example, may be GaAs Hall elements having an output sensitivity of approximately 150 mv/0.1 T/5V. The magnetoelectric transducers 16a, 16b, 16c and 16d are arranged atop the circuit board 18 so that the detected magnetic field direction is perpendicular to the circuit board 18, though in this case with a gap of approximately 3 mm between opposed magnetoelectric transducers 16a and 16c and a gap of approximately 3 mm between opposed magnetoelectric transducers 16b and 16d.

Figure 13:
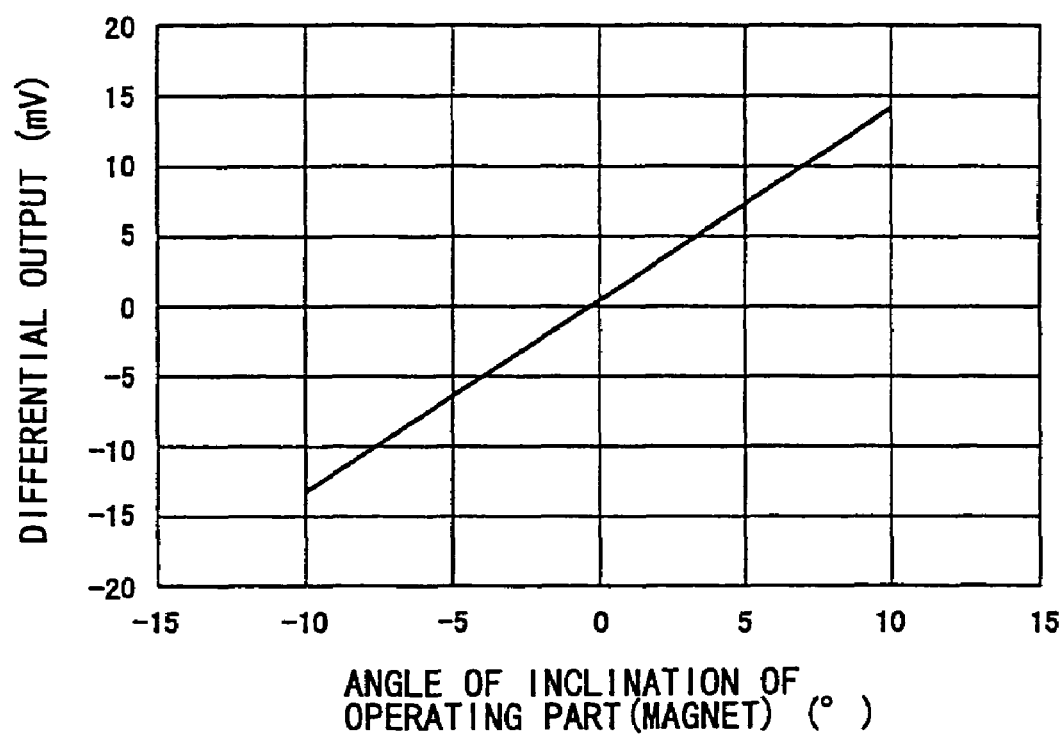
FIG. 13 is a graph showing differential output characteristics in the X(Y) directions of the coordinates input apparatus according to the third embodiment of the present invention.

The relation between the angle of inclination in degrees of the operating part 22 of the coordinates input apparatus 10c, in other words the angle of inclination in degrees of the magnet 12b, on the one hand, and the differential output in mV of the magnetoelectric transducers 16a, 16b, 16c and 16d on the other in an input operation is indicated in FIG. 13. It should be noted that the differential output mV is obtained as a value proportional to the angle of inclination of the magnet 12b.

According to the coordinates input apparatus 10c described above, X,Y coordinate value input data can be obtained promptly and accurately using a simpler calculation process than the conventional art allows. In particular, the integration of the magnetoelectric transducers 16a, 16b, 16c and 16d into a package 34 that is housed inside the case 32 allows the arrangement of the magnetoelectric transducers 16a, 16b, 16c and 16d to be made more compact, thus allowing the coordinates input apparatus 10c as a whole to be made more compact.

A description will now be given of a coordinates input apparatus according to a fourth embodiment of the present invention, with reference to FIG. 14 and FIG. 15.

Figure 14:
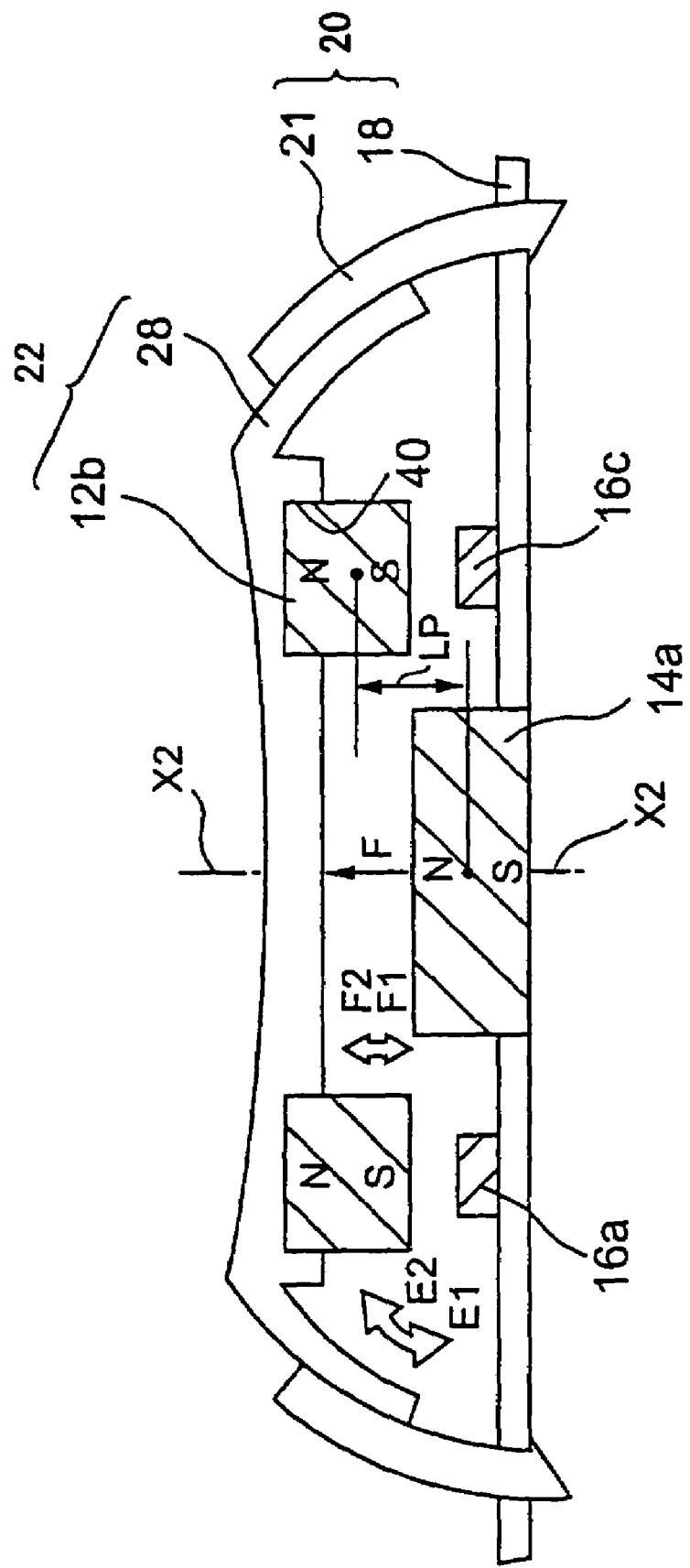
FIG. 14 is a front cross-sectional view of a coordinates input apparatus according to a fourth embodiment of the present invention.
Figure 15:
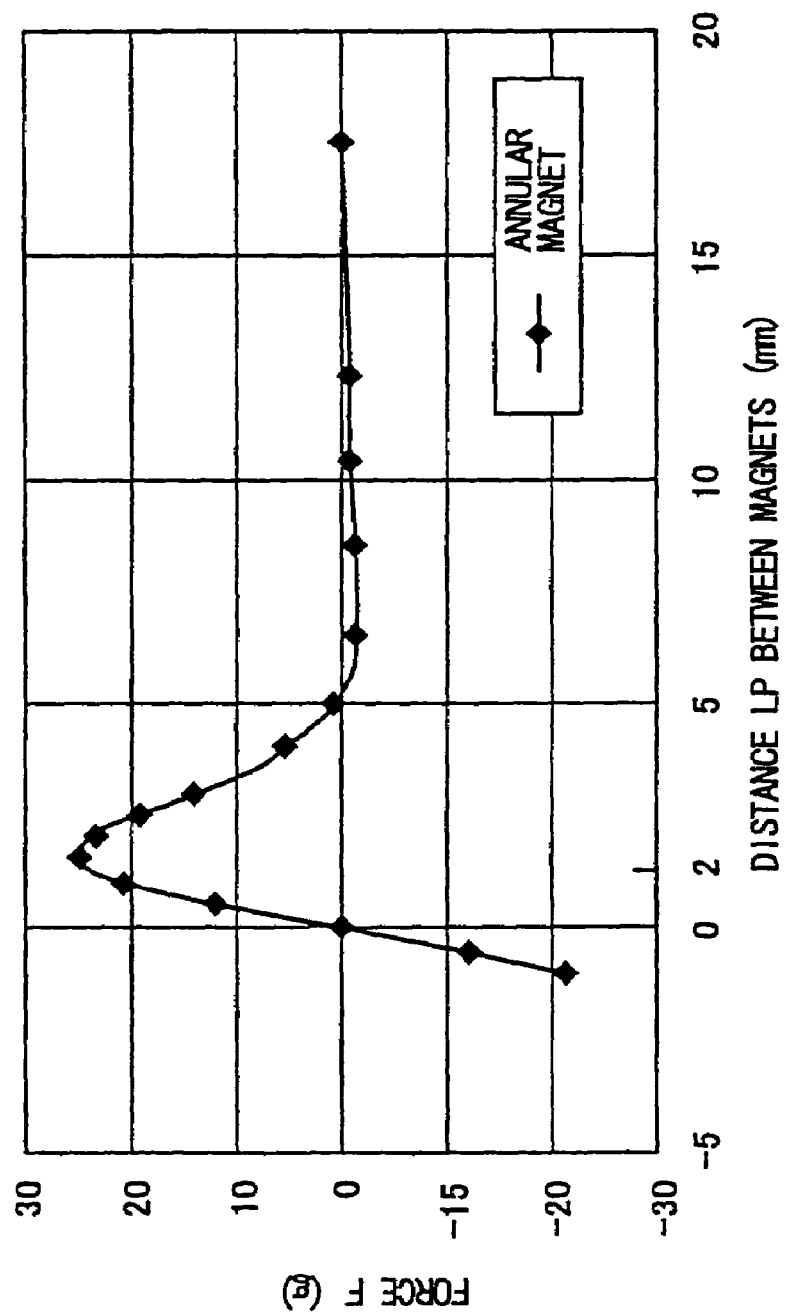
FIG. 15 is a graph showing a relationship between a force acting on the magnets and a distance between magnets in a coordinates input apparatus according to a fourth embodiment of the present invention.

FIG. 14 is a front cross-sectional view of a coordinates input apparatus according to a fourth embodiment of the present invention. FIG. 15 is a graph showing a relationship between a force acting on the magnets and a distance between magnets in a coordinates input apparatus according to a fourth embodiment of the present invention.

As shown in FIG. 14, the coordinates input apparatus 10d has a basic structure that is essentially identical to that of the coordinates input apparatus 10a and the coordinates input apparatus 10b of the first and second embodiments, respectively, comprising the housing 20, the operating part 22 having the second magnet 12b, the magnetoelectric transducers 16a, 16b, 16c and 16d and the first magnet 14a.

The housing 20 comprises the circuit board 18 and the holder 21, shaped so as to have a vertically curved surface.

The first magnet 14a, which is substantially cylindrical in shape, is mounted at the center of the top surface of the circuit board 18 so that its north magnetic pole faces upward. The four magnetoelectric transducers 16a, 16b, 16c and 16d are mounted on the circuit board 18 and positioned symmetrically about the outer periphery of the first magnet 14a.

The operating part 22 is shaped substantially like an upside down bowl, with a cylindrical concavity 40 formed along the outer periphery of the inner rim of the operating part 22. Two second magnets 12b, which are also cylindrically shaped, are positioned within the concavities 40 above and to the outside of the first magnet 14b, the south magnetic pole of the second magnets 12b facing downward.

At this time, a distance separating the center of gravity W1 of the second magnet 12b and the center of gravity W2 of the first magnet 14b is indicated in FIG. 14 as LP, which distance, if small enough, allows for the generation of a repulsive force between the two magnets 12b and 14b indicated as F in FIG. 14.

That is, in other words, for example, the magnets 12b may be SmCo plastic magnets having an outer diameter of 12 mm, an inner diameter of 7 mm and a thickness of 2.5 mm, and the first magnet 14b may be a SmCo plastic magnet having a diameter of 5 mm and a thickness of 2.5 mm. In such a case, the force F exerted upward on the second magnets 12b by the repulsive force generated between the two magnets varies in a rough curve according to the size of the gap LP described above and as shown in FIG. 15, reaching its peak when LP is approximately 2 mm.

The point at which the repulsive force generated between the two magnets 12b, 14b is at its maximum is set to a range of from 0 mm to 5 mm. The operating part 22 is restrained by the housing 20 so that the magnet 12b does not rise further when the two magnets are separated by a distance that exceeds that range. As a result, the curved slider 28 of the operating part 22 is pressed against and restrained by the interior of the holder 21 by the force of repulsion arising between the two magnets, in such a way as to slidable in the direction of arrow E1-E2. Additionally, by applying an appropriate level of downward pressure on the operating part 22, the operating part 22 can be pressed upward by the rapidly changing force F generated within the range of 0–5 mm.

It should be noted that the magnetoelectric transducers 16a, 16b, 16c and 16d for example, may be GaAs Hall elements having an output sensitivity of approximately 150 mv/0.1 T/5V. The magnetoelectric transducers 16a, 16b, 16c and 16d are arranged atop the circuit board 18 so that the detected magnetic field direction is perpendicular to the circuit board 18, though in this case with a gap of approximately 3 mm between opposed magnetoelectric transducers 16a and 16c and a gap of approximately 3 mm between opposed magnetoelectric transducers 16b and 16d.

The relation between the angle of inclination in degrees of the operating part 22 of the coordinates input apparatus 10c, in other words the angle of inclination in degrees of the magnet 12b, on the one hand, and the differential output in mV of the magnetoelectric transducers 16a, 16b, 16c and 16d on the other in an input operation is the same as that shown in FIG. 10 and FIG. 11, so a further description thereof shall be omitted.

According to the coordinates input apparatus 10a described above, X,Y coordinate value input data can be obtained with a simpler, more compact coordinates input apparatus than the conventional art allows. The compactness of the coordinates input apparatus 10a is in part due to the use of Hall elements for the magnetoelectric transducers 16a, 16b, 16c and 16d. The use of Hall elements also has the advantage of enabling the coordinates input apparatus 10a to be produced inexpensively.

Additionally, as can be appreciated from the trend of the upward force exerted on the second magnet 12b shown by the graph in FIG. 15, the force F maintains a peak when the LP is at approximately 2 mm, which means that the force required to depress the operating part 22, that is, the magnet 12b, from a point above LP=2 mm increases up to the point at which LP=2 mm, below which point the force required to depress the magnet 12b decreases. Therefore, according to the coordinates input apparatus 10d having the structure described above, depressing the operating part 22 imparts a sense that the pressing force decreases at a point approximately at which LP=2 mm, which sensation feels something like a click of a mouse button or the like.

Additionally, by utilizing the above-described configuration and, for the Z coordinate, setting the output of the magnetoelectric transducers 16a, 16b, 16c and 16d at a threshold ON/OFF binary value at the point approximately at which LP=2 mm, the user can physically as well as visually sense the switchover between ON/OFF.

Figure 16:
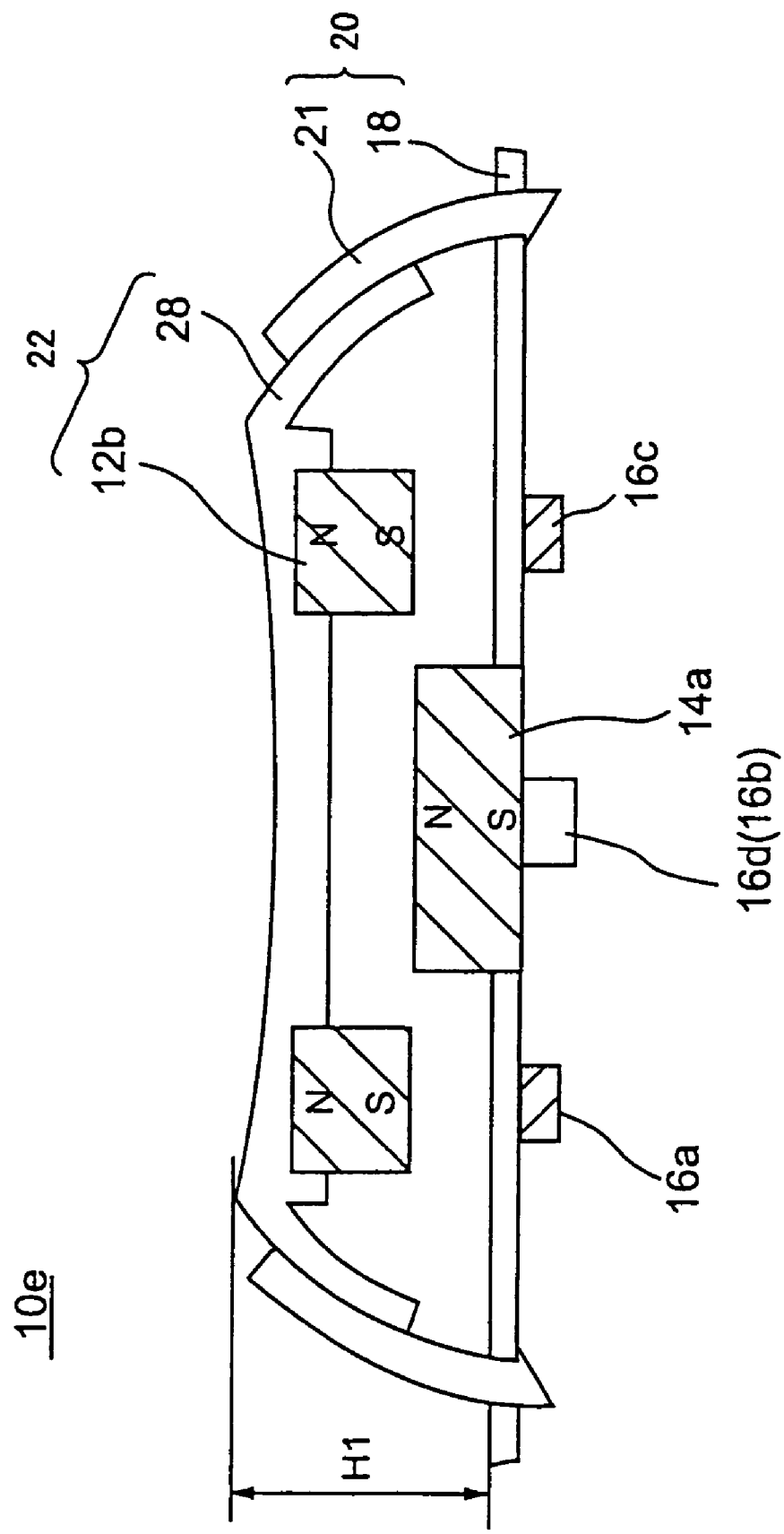
FIG. 16 is a front cross-sectional view of a coordinates input apparatus according to a first variation of a fourth embodiment of the present invention.

A description will now be given of a coordinates input apparatus according to a first variation of the fourth embodiment of the present invention, with reference to FIG. 16.

As shown in the diagram, the coordinates input apparatus 10e according to the first variation of the fourth embodiment of the present invention positions the magnetoelectric transducers 16a, 16b, 16c and 16d on a lower surface of the circuit board 18. Such an arrangement allows the frame, composed as it is of the housing 20 and the operating part 22, to be shortened to a distance indicated as H1.

Figure 17:
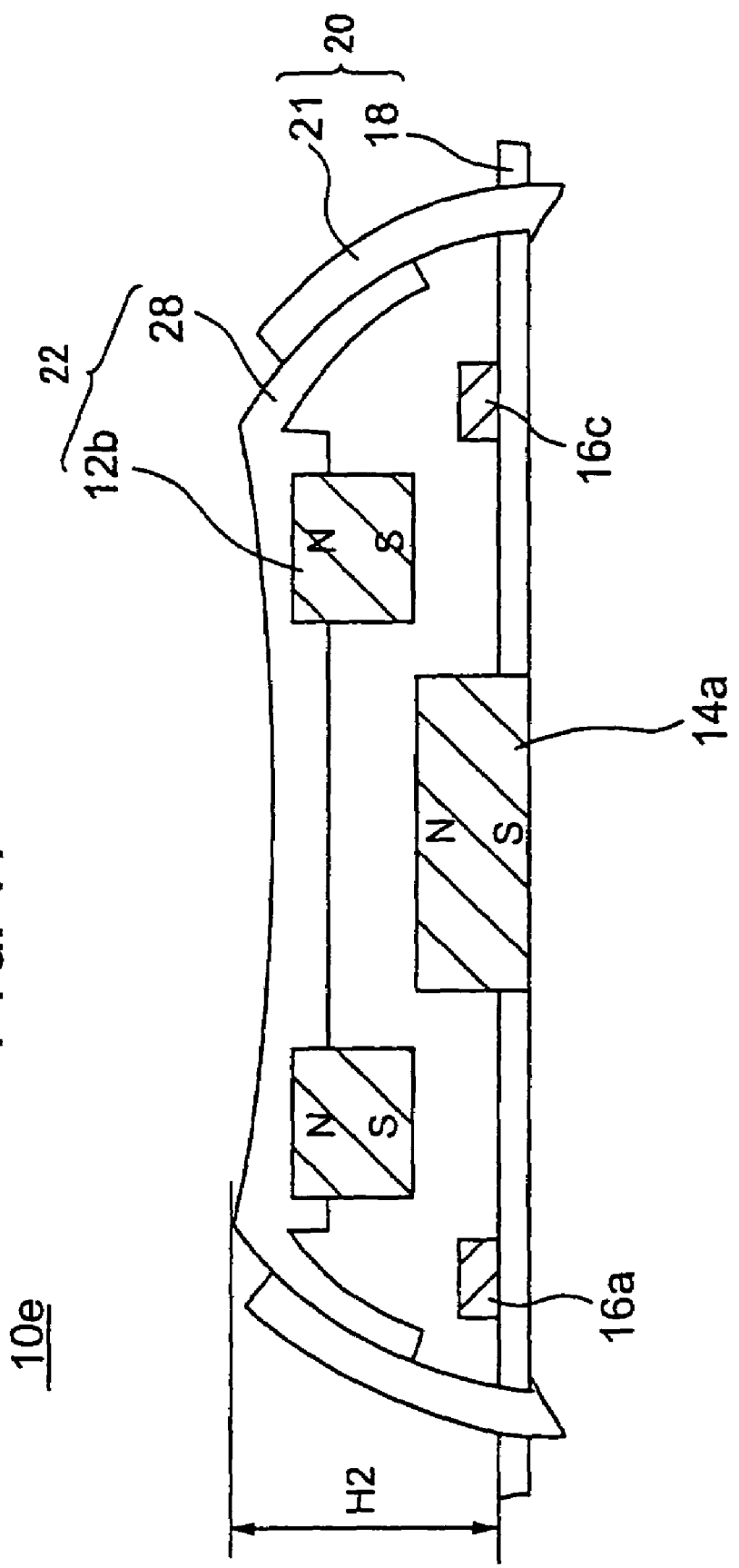
FIG. 17 is a front cross-sectional view of a coordinates input apparatus according to a second variation of a fourth embodiment of the present invention.

A description will now be given of a coordinates input apparatus according to a second variation of the fourth embodiment of the present invention, with reference to FIG. 17.

As shown in the diagram, the coordinates input apparatus 10f according to the second variation of the fourth embodiment of the present invention positions the magnetoelectric transducers 16a, 16b, 16c and 16d on the circuit board 18 at a point outside of the second magnets 12b, that is, closer to the interior wall of the holder 21 than is the case with the coordinates input apparatus 10d according to the fourth embodiment of the present invention. Such an arrangement avoids interference between the second magnets 12b and the magnetoelectric transducers 16a, 16b, 16c and 16d, and allows the coordinates input apparatus to be further shortened to a height indicated as H2.

A description will now be given of a coordinates input apparatus according to a third variation of the fourth embodiment of the present invention, with reference to FIG. 18.

Figure 18:
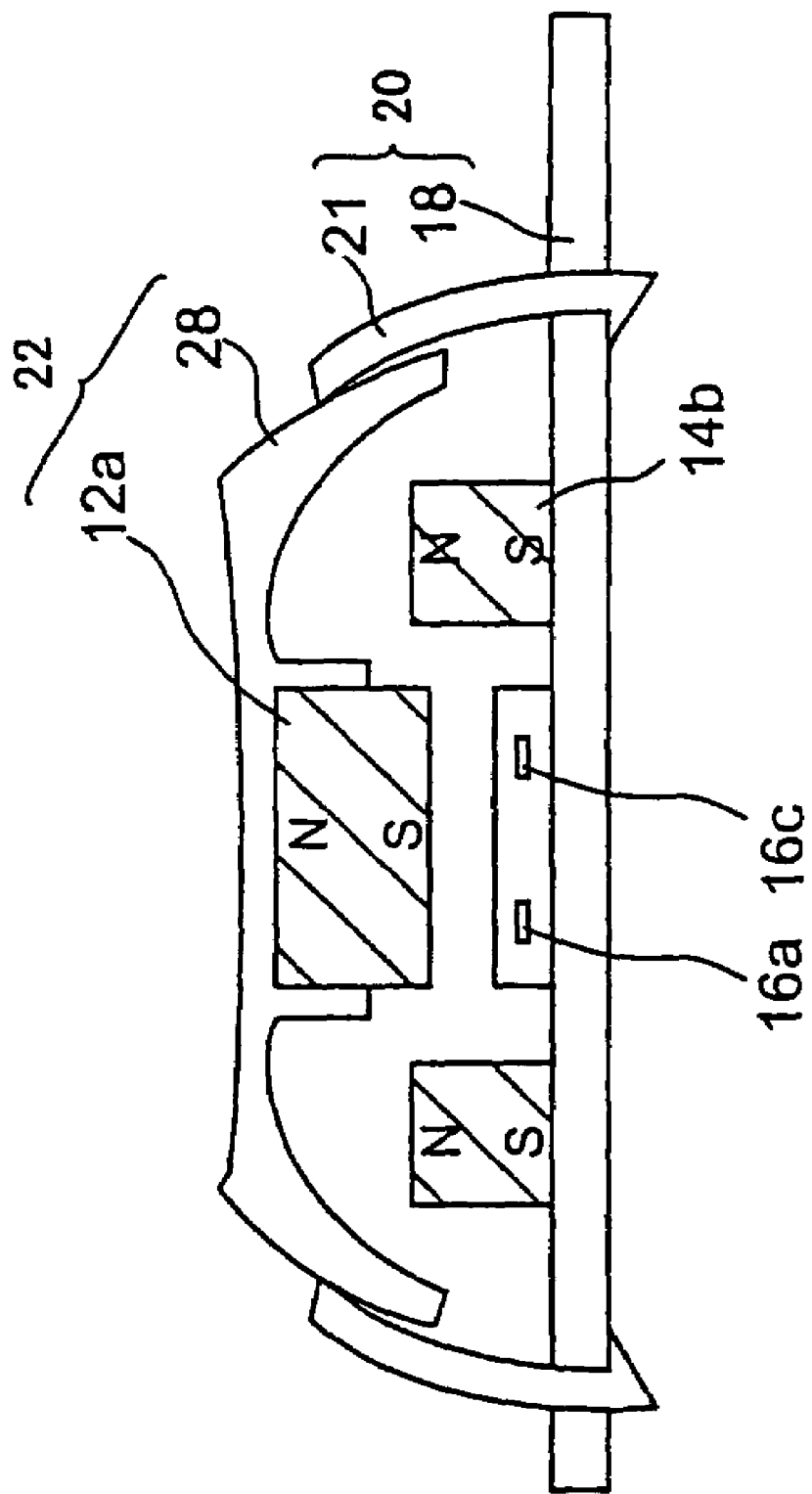
FIG. 18 is a front cross-sectional view of a coordinates input apparatus according to a third variation of a fourth embodiment of the present invention.

FIG. 18 is a front cross-sectional view of a coordinates input apparatus according to a third variation of a fourth embodiment of the present invention.

As shown in the diagram, in the coordinates input apparatus 10g according to the third variation of the fourth embodiment of the present invention, the first magnet 14b fixedly mounted on the circuit board 18 is annular in-shape, the second magnet 12a is cylindrical in shape and the magnetoelectric transducers 16a, 16b, 16c and 16d are positioned inside the first magnet 14b on the top surface of the circuit board 18. With such a structure the coordinates input apparatus 10g achieves the same effect as the coordinates input apparatus 10d according to the fourth embodiment of the present invention.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-193364, filed on Jun. 27, 2000, the contents of which are hereby incorporated by reference.

What is claimed is:

1. A coordinate input apparatus for designating a particular set of coordinate in three-dimensional space, comprising:
    a cylindrical magnet having a center axis;
    an annular magnet having a center axis in common with the center axis of the cylindrical magnet and having an inner circumference larger than an outer circumference of the cylindrical magnet;
    a plurality of magnetoelectric transducers disposed in a plane transverse to the common center axes of the cylindrical and annular magnets, wherein:
        the cylindrical magnet and the annular magnet are disposed so that respective, identical magnetic poles thereof are in opposing relationship, and
        the annular magnet is tiltable with respect to the cylindrical magnet and the plane of the magnetoelectric transducers, and
    the magnetoelectric transducers detect a change in a magnetic field caused by tiling of the annular magnet relatively to the cylindrical magnet and the plane of the magnetoelectric transducers, so as to input two-dimensional coordinate values according to the detected change in the magnetic field.

2. The coordinate input apparatus as recited in claim 1, further comprising:
    a holder fixedly mounted with respect to the cylindrical magnet and having a curved interior surface symmetrically disposed with respect to the common center axes of the cylindrical and annular magnets and surrounding both of the cylindrical and annular magnets; and
    a slide support having an outer curved surface slidingly engageable in mating relationship with the interior curved surface of the holder and supporting thereon the annular magnet; and
    the cylindrical and annular magnets producing a force of repulsion therebetween, engaging the mating, outer curved surface of the slide support with the inner curved surface of the holder in a sliding relative relationship therebetween to afford rotation of the holder relatively to the slide support and corresponding tilting of the annular magnet with respect to the magnetoelectric transducers.

3. The coordinate input apparatus as recited in claim 1, wherein the cylindrical magnet is a substantially solid, cylindrical structure having parallel opposite ends perpendicular to the center axis thereof.

4. The coordinate input apparatus according to claim 1, wherein each of the plurality of magnetoelectric transducers is mounted so as to be separated a distance from each of the cylindrical and annular magnets.

5. A coordinate input apparatus for designating a set of coordinates in three-dimensional space, comprising:
    an annular magnet having a center axis;
    a cylindrical magnet having a central axis in common with the center axis of the annular magnet and an outer circumference smaller than an inner circumference of the annular magnet;
    a plurality of magnetoelectric transducers disposed in a plane transverse to the common central axes of the angular and cylindrical magnets, wherein:

the annular magnet and the cylindrical magnet are disposed so that respective, identical magnetic poles thereof are in opposing relationship, and the cylindrical magnet is tiltable with respect to the annular magnet and the plane of the magnetoelectric transducers; and the magnetoelectric transducers detect a change in a magnetic field caused by tiling of the cylindrical magnet relatively to the annular magnet and the plane of the magnetoelectric transducers, so as to input two-dimensional coordinate values according to the detected change in the magnetic field.

6. The coordinate input apparatus as recited in claim 5, further comprising:

a holder fixedly mounted with respect to the annular magnet and having a curved interior surface symmetrically disposed with respect to the common center axes of the cylindrical and annular magnets and surrounding both of the cylindrical and annular magnets; and a slide support having an outer curved surface slidingly engageable in mating relationship with the interior curved surface of the holder and supporting thereon the annular magnet; and the cylindrical and annular magnets producing a force of repulsion therebetween, engaging the mating, outer curved surface of the slide support with the inner curved surface of the holder in a sliding relative relationship therebetween to afford rotation of the holder relatively to the slide support and corresponding tilting of the cylindrical magnet with respect to the magnetoelectric transducers.

7. The coordinate input apparatus as recited in claim 5, wherein the cylindrical magnet is a substantially solid, cylindrical structure having parallel opposite ends perpendicular to the center axis thereof.

8. The coordinate input apparatus according to claim 5, wherein each of the plurality of magnetoelectric transducers is mounted so as to be separated a distance from each of the cylindrical and annular magnets.

9. The coordinate input apparatus according to claim 5, wherein each of the plurality of magnetoelectric transducers is mounted so as to be separated a distance from each of the cylindrical and annular magnets.

10. A coordinate input apparatus for designating a set of coordinates in three-dimensional space, comprising:

an annular magnet having a center axis;

a cylindrical magnet having a center axis in common with the center axis of the cylindrical magnet and having an outer circumference smaller that an inner circumference of the annular magnet;

a plurality of magneto electric transducers disposed in a plane perpendicular to the common center axes of the cylindrical and annular magnets, wherein:

the annular magnet and the cylindrical magnet are disposed so that respective, identical magnetic poles thereof are in opposing relationship, and the cylindrical magnet is tiltable with respect to the annular magnet; and the magnetoelectric transducers detect a change in a magnetic field caused by tilting of the cylindrical magnet relatively to the annular magnet and the plane of the magnetoelectric transducers, so as to input two-dimensional coordinate values according to the detected change in the magnetic field.

11. The coordinate input apparatus as recited in claim 10, further comprising:

a holder fixedly mounted with respect to the annular magnet and having a curved interior surface symmetrically disposed with respect to the common center axes of the cylindrical and annular magnets and surrounding both of the cylindrical and annular magnets; and a slide support having an outer curved surface slidingly engageable in mating relationship with the interior curved surface of the holder and supporting thereon the cylindrical magnet; and the cylindrical and annular magnets producing a force of repulsion therebetween, engaging the mating, outer curved surface of the slide support with the inner curved surface of the holder in a sliding relative relationship therebetween to afford rotation of the holder relatively to the slide support and corresponding tilting of the cylindrical magnet with respect to the magnetoelectric transducers.

12. The coordinate input apparatus as recited in claim 11, wherein the cylindrical magnet is a substantially solid, cylindrical structure having parallel opposite ends perpendicular to the center axis thereof.

13. A coordinates input apparatus for designating a set of coordinates in three-dimensional space, the coordinates input apparatus comprising:

first and second magnets having a common central axis and respective lines of magnetic flux in opposing relationship;

a plurality of magnetoelectric transducers disposed in a plane transverse to the common central axis, positional symmetrically thereabout and relatively to the opposing lines of magnetic flux, and displaced radially from the pole of at least one of the first and second magnets; and the second magnet being tiltable relatively to the plane of the magnetoelectric transducers, angularly displacing the axis thereof relatively to the common central axis and the plane of the magnetoelectric transducers, and the magnetoelectric transducers outputting corresponding voltages having values that vary according to the magnitude of the tilt of the second magnet relatively to the plane of the magnetoelectric transducers, and producing output voltages having differential voltage values indicating a set of X-Y coordinates in two-dimensional space, wherein the magnetolelectric transducers are positioned outside a space defined between the first and second magnets.

14. The coordinate input apparatus as recited in claim 13, further comprising:

a holder fixedly mounted with respect to one of the first and second magnets and having a curved interior surface symmetrically disposed with respect to the common center axes of the first and second magnets and surrounding both of the first and second magnets; and a slide support having an outer curved surface slidingly engaging in mating relationship with the interior curved surface of the holder and supporting thereon the other of the first and second magnets; and the first and second magnets producing a force of repulsion therebetween, engaging the mating, outer curved surface of the slider support with the inner curved surface of the holder in a sliding relative relationship therebetween to afford rotation of the holder relatively to the slide support and tilting of the other of the first and second magnets with respect to the other of the first and second magnets.

15. The coordinate input apparatus as recited in claim 13, wherein the first and second magnets are substantially identical, cylindrical magnets having flat end surfaces in a plane perpendicular to the common axes thereof.

16. The coordinate input apparatus as recited in claim 13, wherein the first magnet is a solid cylindrical magnet fixedly mounted to the holder; and the second magnet is an annular magnet carried by the slide support.

17. The coordinate input apparatus as recited in claim 13, wherein the first magnet is a solid cylindrical annular fixedly mounted to the holder; and the second magnet is an cylindrical magnet carried by the slide support.

18. A coordinates input apparatus for designating a second of coordinates in three-dimensional space, as recited in claim 13, wherein:
- the first and second magnets are each of a cylindrical configuration and have opposite poles in spaced relationship along the common central axis; and
- the electromagnetic transducers are disposed in the plane, transverse to the common central axis and at a radius thereabout greater than a radius of the outer surface of the first and second magnets.

* * * * *